(12) United States Patent
Janian

(10) Patent No.: US 6,419,236 B1
(45) Date of Patent: Jul. 16, 2002

(54) SPRINGCLIP RING

(76) Inventor: Robert Janian, 3845 Ballina Canyon Rd., Encino, CA (US) 91436

( * ) Notice: Subject to any disclaimer, the term of this patent is extended or adjusted under 35 U.S.C. 154(b) by 79 days.

(21) Appl. No.: 09/613,150

(22) Filed: Jul. 3, 2000

Related U.S. Application Data

(60) Provisional application No. 60/149,727, filed on Aug. 20, 1999.

(51) Int. Cl.$^7$ ................................................ F16J 15/32
(52) U.S. Cl. ...................... 277/553; 277/555; 277/557
(58) Field of Search .................. 277/438, 472, 277/553, 555, 554, 557

(56) References Cited

U.S. PATENT DOCUMENTS

| | | | |
|---|---|---|---|
| 1,854,708 A | * | 4/1932 | Mastin et al. |
| 2,093,572 A | * | 9/1937 | Padgett |
| 2,106,829 A | * | 2/1938 | Christenson |
| 2,511,386 A | * | 6/1950 | Warren |
| 3,229,987 A | * | 1/1966 | Folkerts |
| 3,301,568 A | * | 1/1967 | Perry |
| 4,067,407 A | * | 1/1978 | Berg |
| 4,145,057 A | * | 3/1979 | Wheeler |
| 4,508,356 A | * | 4/1985 | Janian |
| 4,585,239 A | * | 4/1986 | Nicholson |
| 4,655,462 A | * | 4/1987 | Balsells |
| 5,630,591 A | * | 5/1997 | Drijver et al. |
| 5,799,953 A | * | 9/1998 | Henderson ................... 277/554 |
| 5,984,316 A | * | 11/1999 | Balsells ....................... 277/553 |

* cited by examiner

*Primary Examiner*—Anthony Knight
*Assistant Examiner*—Alison K. Pickard

(57) ABSTRACT

This invention describes a seal ring which is consisted of a spiral spring wire acting as an expander device where in turn is inserted inside a C and or U shaped jacket made of a softer material such as elastomer or teflon in such a manner that forces the outer and inner lips of this jacket outwardly and inwardly accordingly to create a seal under extreme side loading and offsets of mating shaft.

3 Claims, 10 Drawing Sheets

CROSS SECTIONAL VIEW A-A

CROSS-SECTIONAL VIEW

SPRINGCLIP RING

This application claims the benefit of provisional application Ser. No. 60/149,727 filed Aug. 20, 1999.

FIELD OF THE INVENTION

This invention relates to mechanical seals of various materials having inner expanders and energizers to provide Resiliency needed for sealing the passage between two adjacent surfaces.

BACKGROUND OF THE INVENTION

Spring seals in variety of sizes are being used for a range of critical applications as static and dynamic sealing elements, they are exposed to high and low temperatures along with extremely corrosive media and jacket element wears out and also shrinks to the point where departs itself from gland outside diameter to the point where it creates leakage. Such failures have been caused by poor construction features of expanders and energizers which have failed to provide continuous reliable sealing over extended periods of time.

A number of different configurations of spring seals are known, as for example my prior U.S. Pat. No. 4,133,542, on a configuration and method for making, a spring seal, where the spring has a circular base for insertion into a mating concavity in the jacket. My other prior U.S. Pat. Nos. 4,508,356, and 4,939,830, describes a modified C shaped hemispherical spring which could also be exchanged with an elastomeric o-rig in its jacket cavity, however Up to now, every spring and expander has its own limitations as far as resiliency to greater gland runout and variations.

With this invention not only a constant accurate force is applied to the sealing surfaces but also keeps outer lip of jacket element independent of inner lip for any eccentric movement which is absolutely vital for any sealing element.

SUMMARY OF THE INVENTION

The object of this invention is to provide an improved spring/energizer combination that overcomes the deficiencies of the prior art. To this, a round wound coil of steel of a single or double loop construction mounted inside jacket or casing thus creating more resiliency and constant force to adjacent sealing surfaces, meanwhile keeping inside diametrical lip independent of outside diameter, this feature is extremely important since biggest problem in dynamic sealing is eccentricity and runout of the shaft or piston on which sealing is taking place.

DRAWING

DESCRIPTION OF THE PREFERRED EMBODIMENTS

Figure 1:
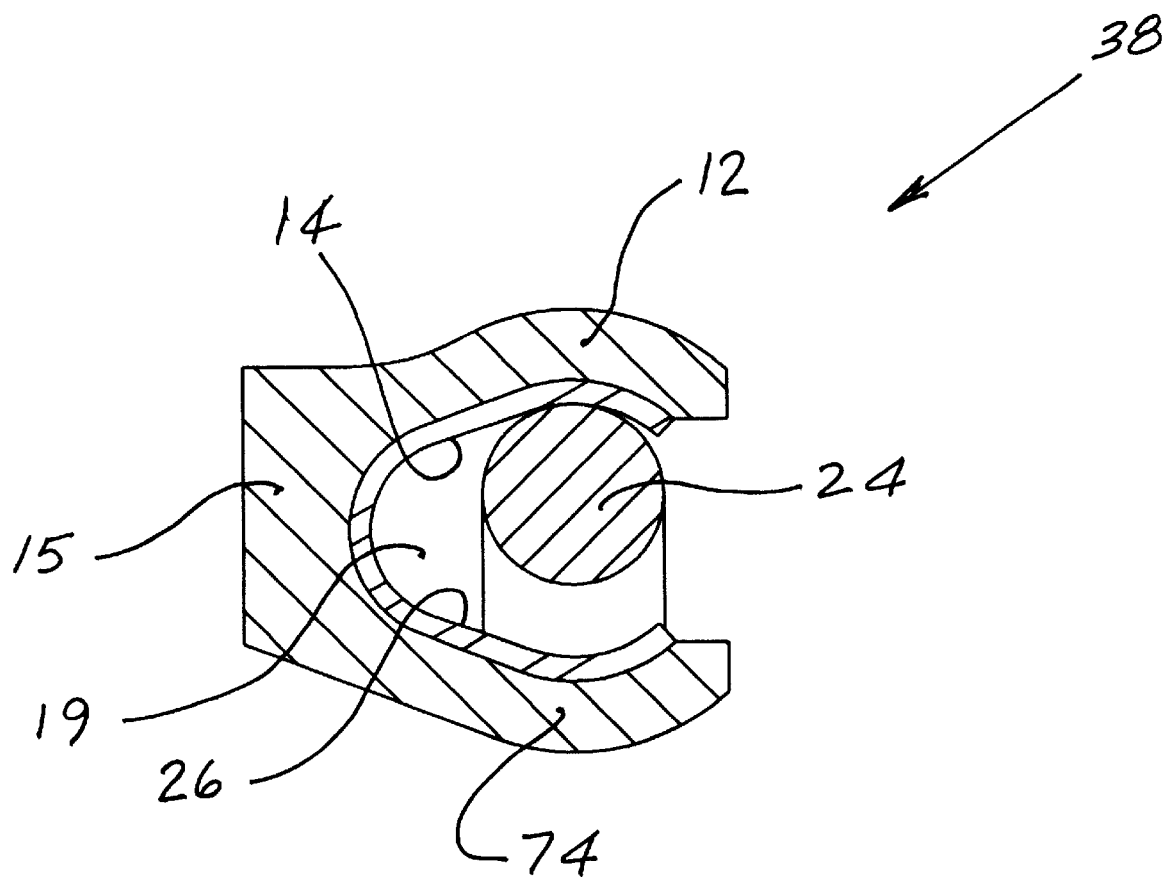
FIG. 1 is a radial cross-section of a spring seal with single loop coiled springclip inserted inside casing.
Figure 2:
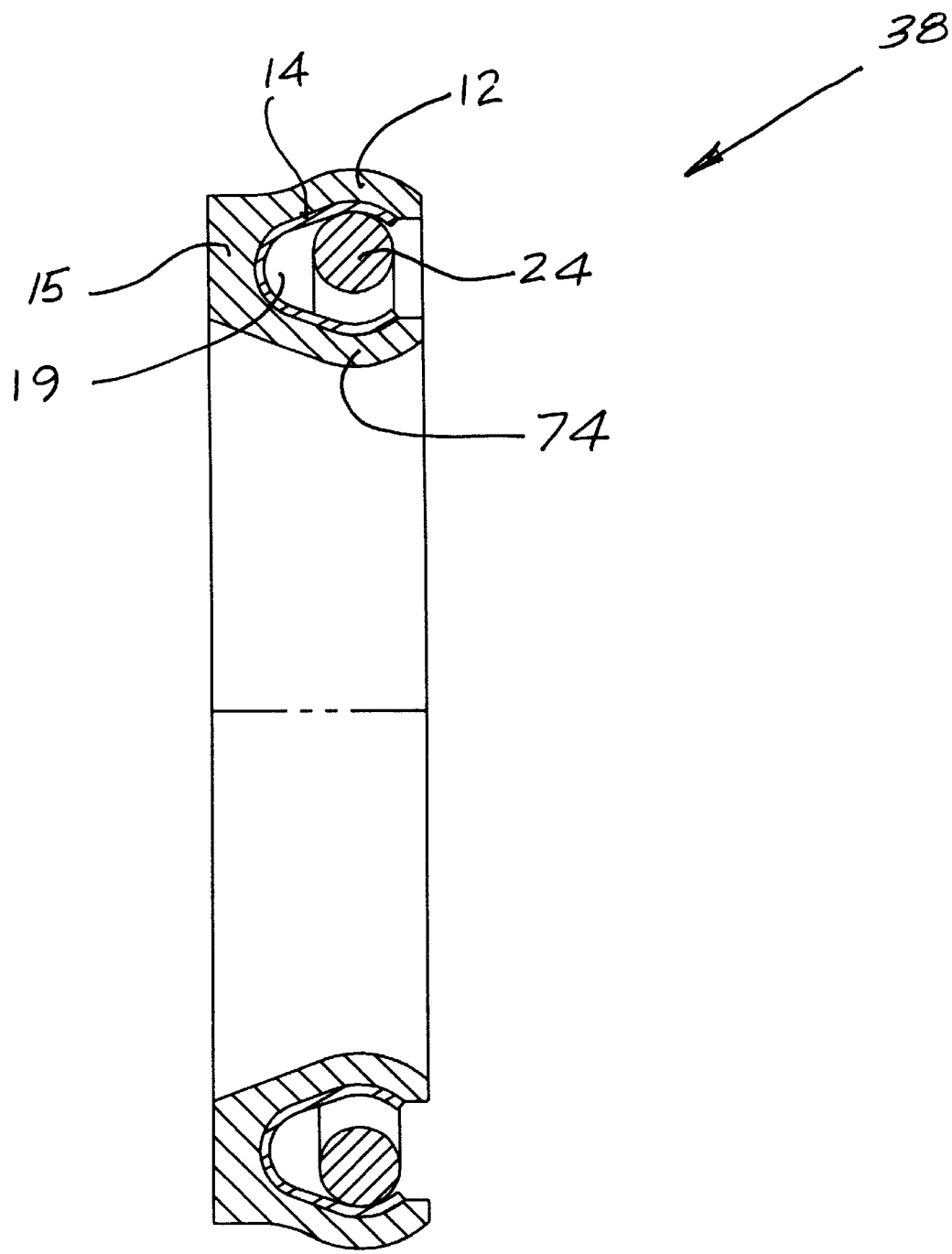
FIG. 2 is a diametrical cross-section of FIG. 1 showing springclip positioned inside seal cavity.
Figure 3:
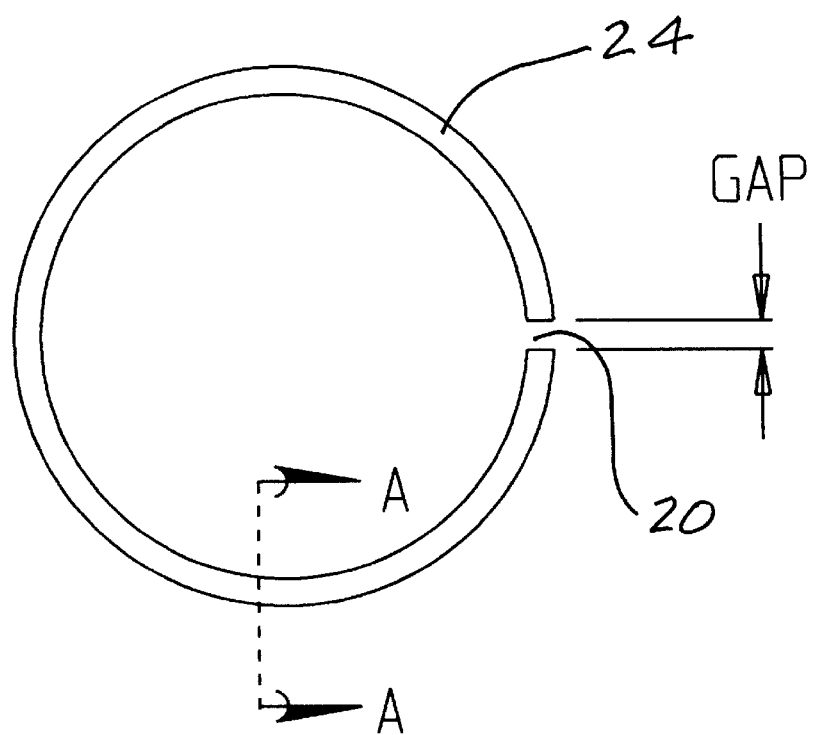
FIG. 3 is frontal and cross-sectional view of a single loop springclip.
Figure 3:
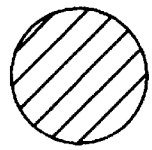
Figure 4:
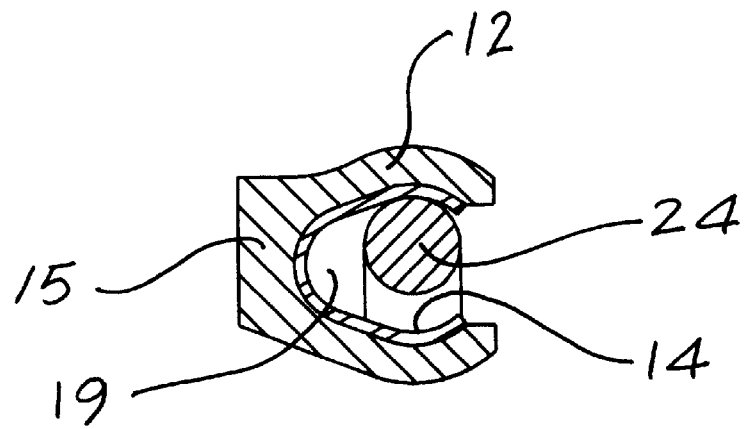
FIG. 4 is seal assembly with expander and single loop springclip and seal assembly inside sealing gland cavity.
Figure 4:
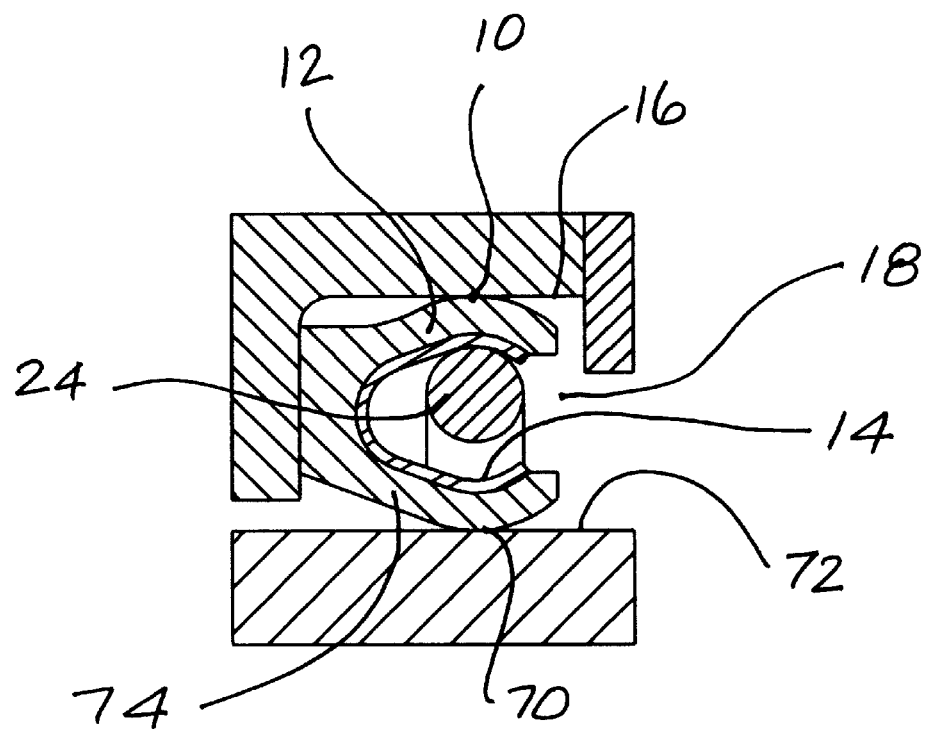
Figure 5:
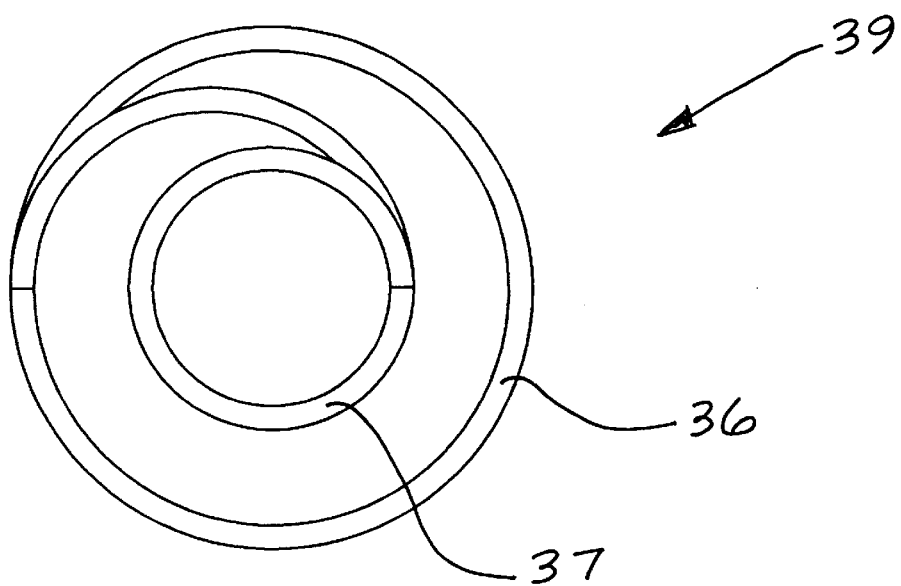
FIG. 5 is frontal and diametrical cross-sectional view of double loop springclip.
Figure 5:
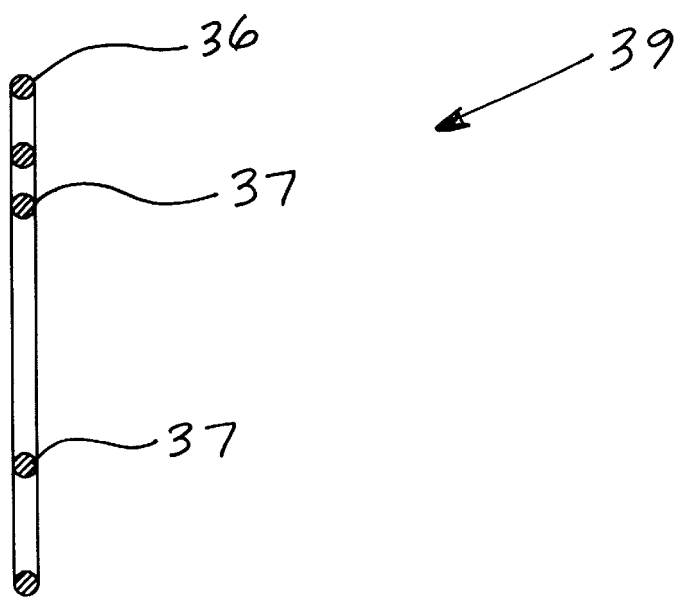
Figure 6:
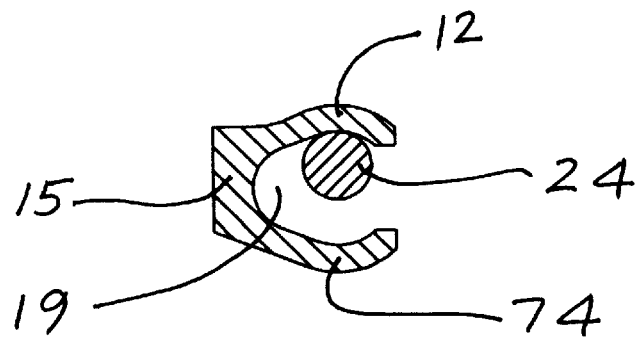
FIG. 6 is radial cross-section of single loop springclip inside seal jacket cavity without any other expander.
Figure 7:
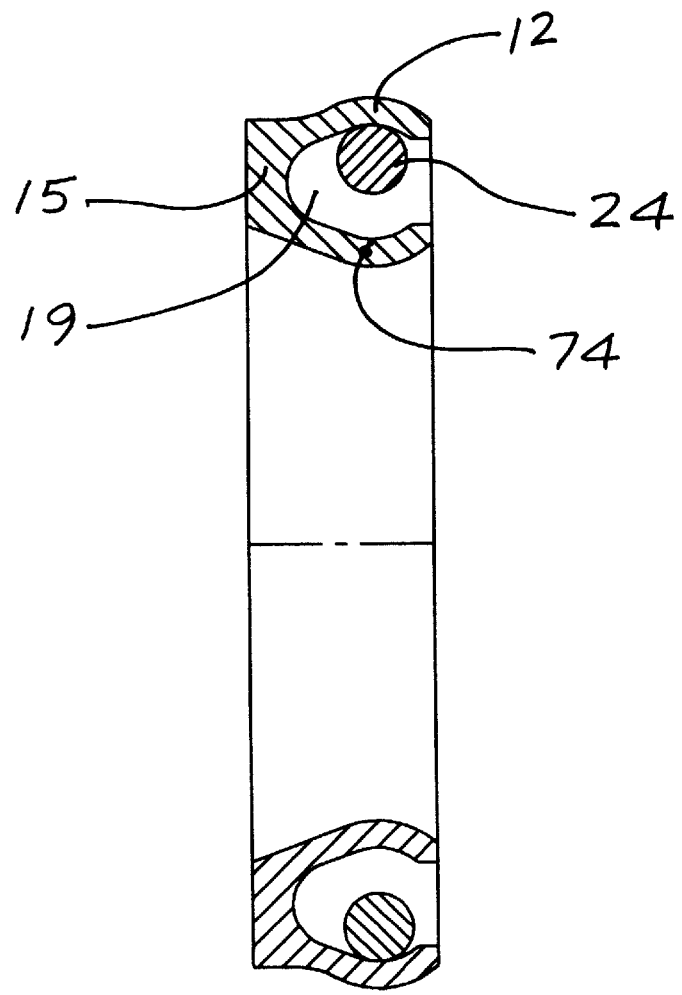
FIG. 7 is diametrical section of FIG. 6.
Figure 8:
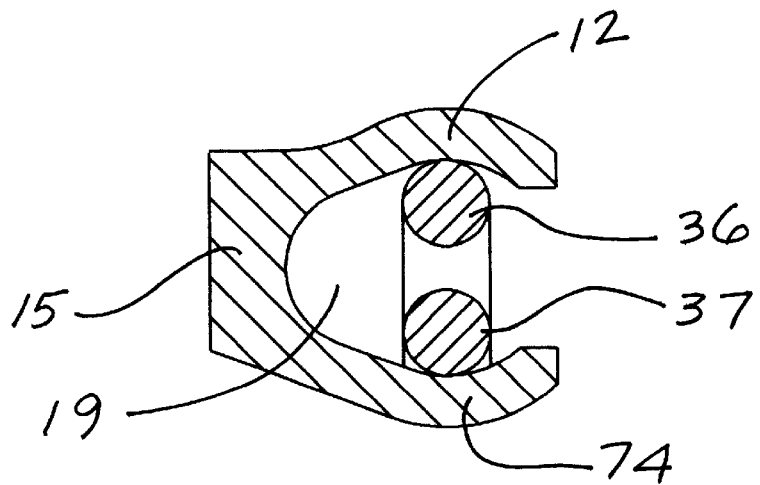
FIG. 8 shows radial section of seal jacket cavity with a double loop springclip inserted inside
Figure 9:
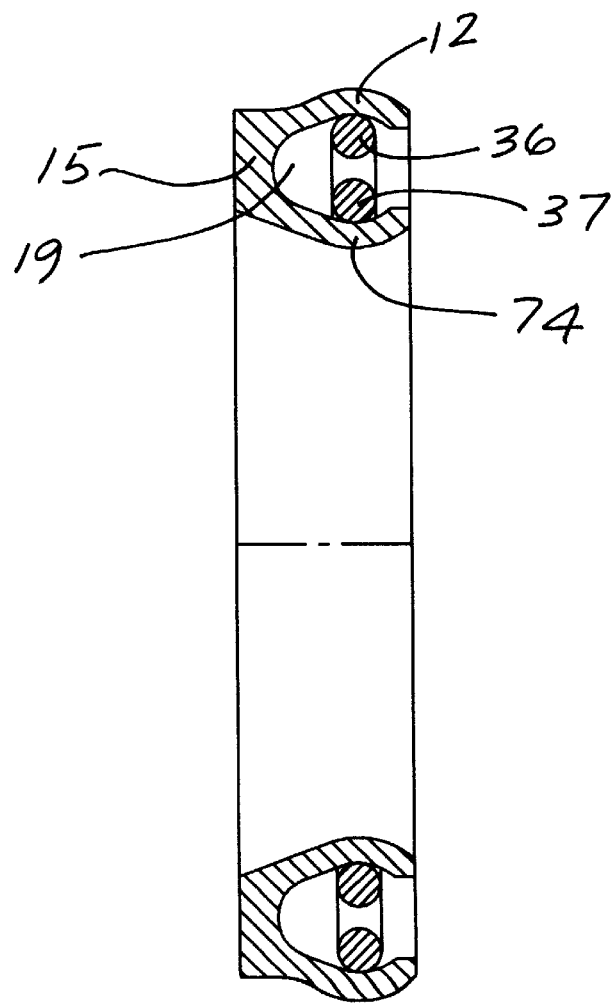
FIG. 9 is a diametrical sectional view of FIG. 8.
Figure 10:
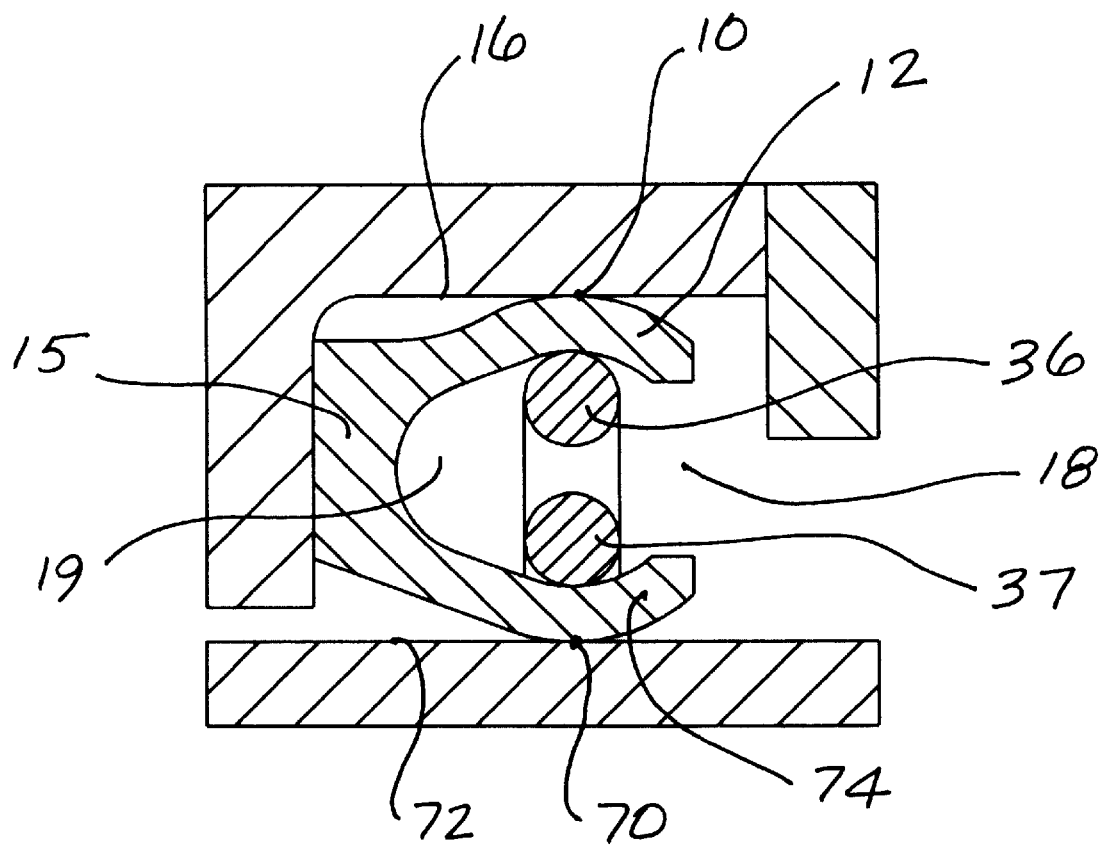
FIG. 10 is double loop springclip seal assembly installed inside gland cavity.
Figure 11:
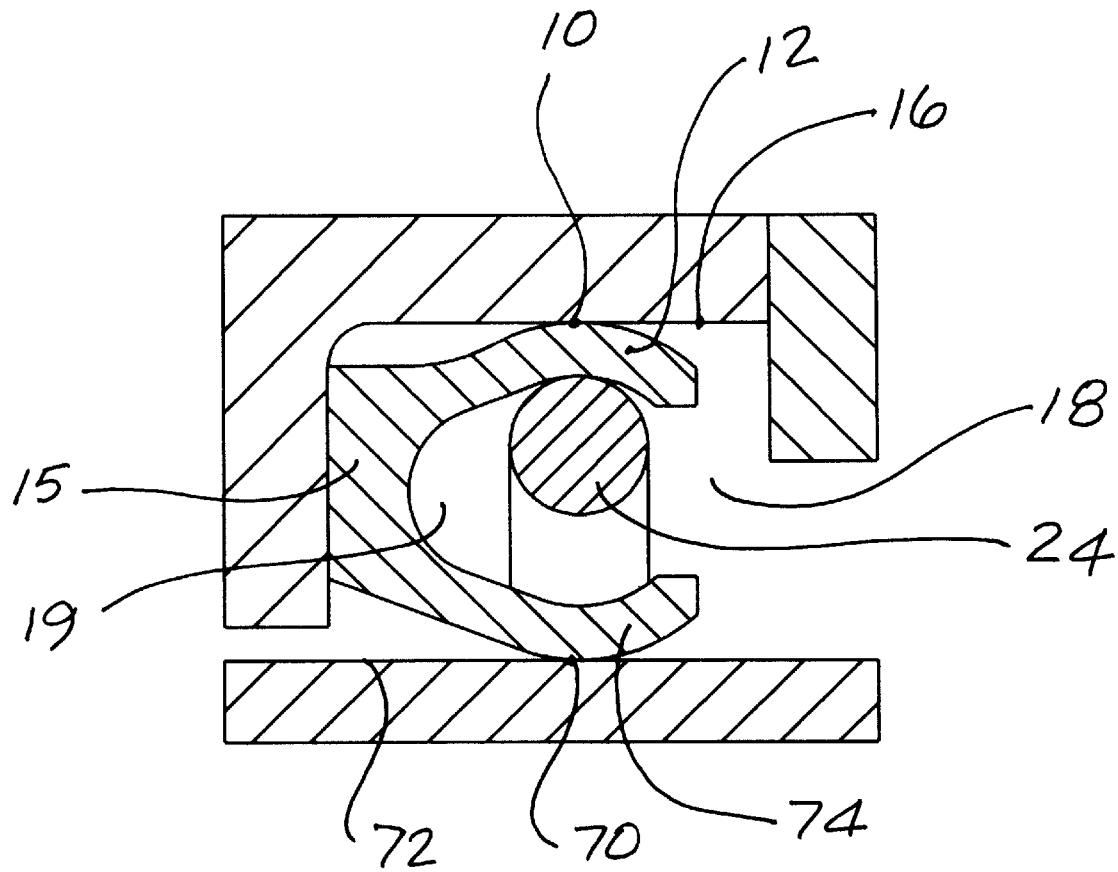
FIG. 11 shows a single loop spring seal assembly inside a gland cavity.
Figure 12:
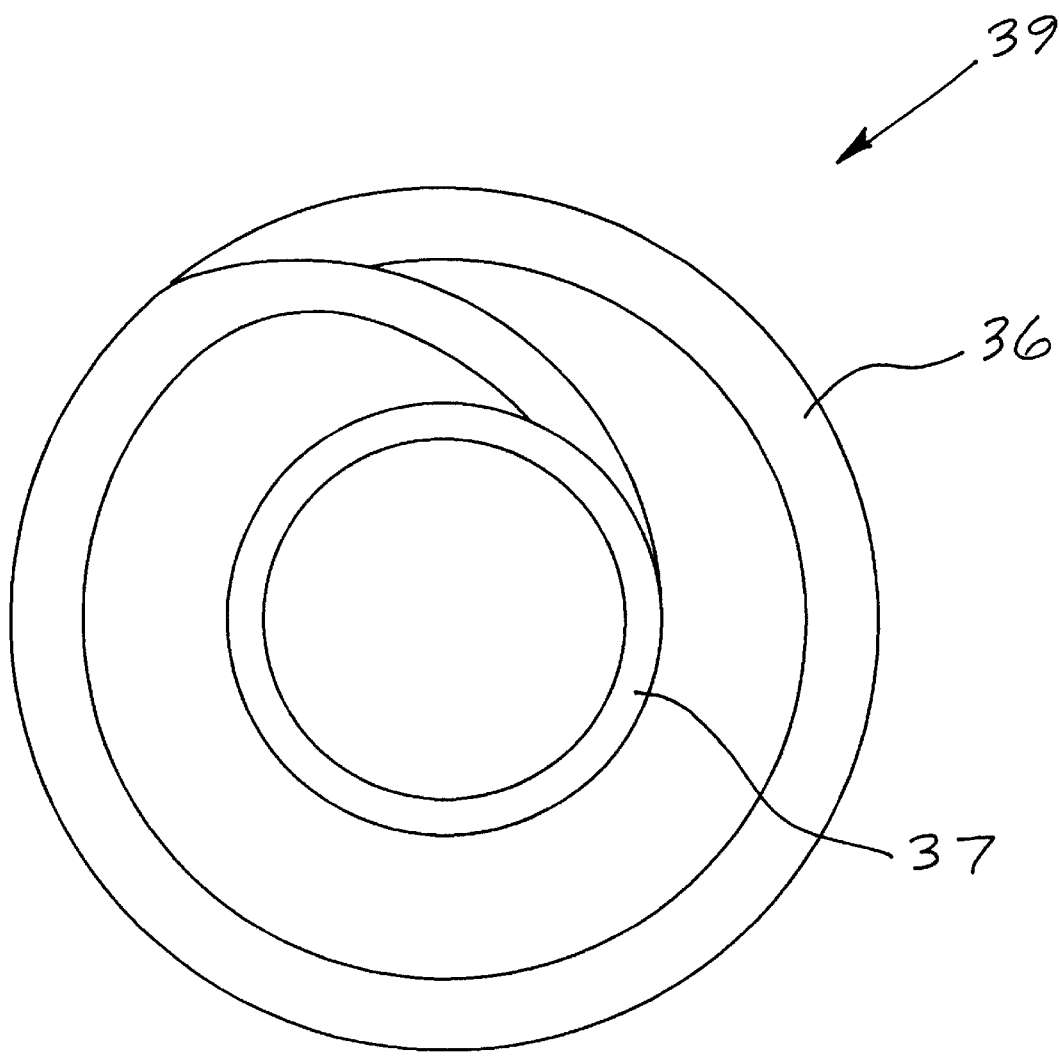
FIG. 12 shows frontal view of double loop springclip with reduced cross-sectional inner loop.

Referring to the drawings, the preferred form of the springclip 24 is a true circle with a compensating gap 20 to correspond with an inner jacket cavity 19. The seal assembly consists of a jacket having a base 15, a pair of cantilever arm portions 12 and 74, a C-shaped cavity with at least two curvatures, and an expander 14. When installed inside a gland cavity 18, springclip 24 exerts a constant outward diametrical force on gland sealing surface 16 at point 10. This force is totally independent of the inner arm 74, which contacts surface 72 at point 70. In the same manner, springclip 24 could be inserted inside jacket cavity 19 without any other expander or energizer, such as when a minimal sealing force is required at point 70. In the same manner, when a greater sealing force is needed for both surfaces 16 and 72, a double loop springclip 39 consisting of an outer loop 36 and inner loop 37 is inserted inside a jacket consisting of a base 15, a pair of cantilever arm portions 12 and 74, and a C-shaped cavity with at least two curvatures. Outer loop 36 creates an outward force on arm 12 and inner loop 37 creates an independent inward force on arm 74, thus creating much greater resiliency compared to other conventional sealing devices. In springclip 39, outer loop 36 may vary its cross-sectional thickness as it turns to the smaller inner loop 37, as shown in FIG. 12.

What is claimed is:

1. A springclip seal assembly comprising:

a jacket having a base and a pair of cantilever arm portions outwardly projecting from said base to define a C-shaped cavity having at least two curvature surfaces, said arm portion forming an inner arm and an outer arm; and a spring element disposed in said cavity, wherein said spring element is a circular double loop having opposite ends separated by a gap, said circular double loop comprises an outer loop gradually transforming to a smaller diameter inner loop, said inner and outer loops bear against said inner and outer arms, respectively, to prevent shrinkage.

2. The springclip seal assembly as set forth in claim 1, wherein said spring element varies in cross-sectional thickness as it transforms from said outer loop to said inner loop.

3. The springclip seal assembly as set forth in claim 1, comprising a second spring element disposed in said C-shaped cavity.

* * * * *